(12) United States Patent
Kondo

(10) Patent No.: US 11,994,082 B1
(45) Date of Patent: May 28, 2024

(54) SEMICONDUCTOR DEVICE

(71) Applicant: RENESAS ELECTRONICS CORPORATION, Tokyo (JP)

(72) Inventor: Takao Kondo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/303,020

(22) Filed: Apr. 27, 2023

(51) Int. Cl.
*F02D 41/28* (2006.01)

(52) U.S. Cl.
CPC ........ *F02D 41/28* (2013.01); *F02D 2041/288* (2013.01)

(58) Field of Classification Search
CPC ............................ F02D 41/28; F02D 2041/288
See application file for complete search history.

(56) References Cited

U.S. PATENT DOCUMENTS

| | | | | |
|---|---|---|---|---|
| 6,542,727 B1* | 4/2003 | Kikuchi | ............. | H04W 52/029 455/343.1 |
| 6,552,752 B1* | 4/2003 | Tsuji | ............. | H04N 5/63 348/730 |
| 6,629,256 B1* | 9/2003 | Ilan | ............. | H03L 7/00 713/503 |
| 7,899,303 B2* | 3/2011 | Leung | ............. | H04N 5/76 348/730 |
| 10,491,235 B1* | 11/2019 | Ruelke | ............. | H04L 1/0025 |
| 10,903,838 B1* | 1/2021 | Brunn | ............. | G06F 1/08 |
| 2001/0027096 A1* | 10/2001 | Lindlar | ............. | H04W 52/0274 455/343.1 |
| 2003/0076747 A1* | 4/2003 | Jung | ............. | G06F 1/14 368/155 |
| 2005/0030081 A1* | 2/2005 | Kishii | ............. | H03F 3/45977 327/307 |
| 2005/0259058 A1* | 11/2005 | Yamaguchi | ............. | G09G 3/3688 345/87 |
| 2006/0176748 A1* | 8/2006 | Druilhe | ............. | G11C 11/406 365/222 |
| 2014/0013138 A1* | 1/2014 | Kanai | ............. | G06F 1/3237 713/323 |
| 2016/0313780 A1* | 10/2016 | Stewart | ............. | G06F 9/5094 |
| 2017/0134010 A1* | 5/2017 | Tsukamoto | ............. | H02J 4/00 |
| 2019/0165974 A1* | 5/2019 | Iijima | ............. | H04L 27/1563 |
| 2021/0080330 A1* | 3/2021 | Takeuchi | ............. | G06F 1/324 |

FOREIGN PATENT DOCUMENTS

JP 06-231280 A 8/1994

* cited by examiner

*Primary Examiner* — Joseph J Dallo
(74) *Attorney, Agent, or Firm* — Rimon P.C.

(57) ABSTRACT

The semiconductor device includes a frequency output circuit that outputs a clock signal having a specified frequency, a circuit block that realizes a predetermined function, and a standby controller that controls a standby mode of the circuit block in accordance with the clock signal. Here, the standby controller includes a control circuit that outputs state information corresponding to the control of the standby mode, a frequency control signal that designates the frequency of the clock signal output from the frequency output circuit in accordance with the state information, and a frequency selection circuit that outputs count information that designates the duration of the state transition of the circuit block.

6 Claims, 9 Drawing Sheets

| State Information | Frequency Information | Counting Value Information |
|---|---|---|
| State_A | 0x00000001 | 0x3 |
| State_B | 0x00000010 | 0x5 |
| State_C | 0x01111111 | 0x1 |
| State_D | 0x00001111 | 0x2 |
| State_F | 0x00000010 | 0x5 |

|     | Tsn+Tns |    | PDI1  |    | PDI2  |    |
|-----|---------|----|-------|----|-------|----|
| (1) | 1125.0  | us | 0.758 | mA | 3.544 | mA |
| (2) | 264.6   | us | 0.683 | mA | 3.172 | mA |
| (3) | 23.5%   |    | 90.2% |    | 89.5% |    |

SEMICONDUCTOR DEVICE

BACKGROUND

The present invention relates to a semiconductor device, and more particularly, to a semiconductor device including a standby mode for reducing power consumption.

For example, a semiconductor device that is mounted on an automobile or the like and controls various parts of the automobile is known. In this case, in order to reduce the power consumption of the semiconductor device, for example, in a period (engine stop period) in which the engine of the automobile is stopped, the semiconductor device is transitioned to the stumber mode. However, when the semiconductor device is always in the standby mode during the engine stop period, it is difficult for the semiconductor device to detect, for example, an operation of starting the engine by the driver. For this reason, even in the engine stop duration, the semiconductor device is returned from the standby mode at predetermined time intervals, and the semiconductor device is transitioned to the standby mode again when the processing such as detection is completed. That is, even in the engine stop period, the semiconductor device is repeatedly transitioned to and returned from the standby mode (standby mode transition/return), and is intermittently operated. Therefore, in order to reduce the power consumption of the semiconductor device, it is important to reduce the average current during the intermittent operation.

There are disclosed techniques listed below.
[Patent Document 1] Japanese Unexamined Patent Application Publication Num. Hei-6-231280

SUMMARY

Japanese Unexamined Patent Application Publication Num. Hei-6-231280 discloses that a plurality of oscillators are provided as an oscillator for generating a clock signal for operating a processor (microcomputer), and an oscillator having a small current consumption is used at startup. The present inventor has considered that the cost and power consumption of the semiconductor device can be reduced by using a clock signal having a low frequency as a clock signal used for controlling the start-up and standby mode transition/recovery of the semiconductor device.

However, the present inventors have further studied, when the frequency of the clock signal used for the control is lowered, it has been found that the period required for starting, the transition period required for the transition to the standby mode and the return period required for the return from the standby mode become longer. As a result, it has been found that there is a concern that, for example, the average current during intermittent operation also increases. In addition, since the control related to the standby mode transition/recovery is increasingly complicated, the time required for this control is also increased, and this also tends to increase the transition period and the recovery period. As a result, there is a concern that the average current during intermittent operation becomes larger.

Further, the present inventors have studied, in the control at the time of standby mode transition/recovery, although a variety of signals are used, when the frequency of the clock signal used for the control is low, it has been found that it may be difficult to generate an appropriate signal. This will be described later with reference to the drawings, and thus will not be described in detail here.

According to an embodiment, a semiconductor device capable of reducing power consumption is provided.

Other objects and novel features will become apparent from the description of this specification and the accompanying drawings.

A semiconductor device according to an embodiment includes a frequency output circuit that outputs a clock signal having a specified frequency, a circuit block that implements a predetermined function, and a standby controller that controls a standby mode of the circuit block in accordance with the clock signal. Here, the standby controller includes a control circuit that outputs state information corresponding to the control of the standby mode, a frequency control signal that designates the frequency of the clock signal output from the frequency output circuit in accordance with the state information, and a frequency selection circuit that outputs count information that designates the duration of the state transition of the circuit block.

DETAILED DESCRIPTION

Hereinafter, an embodiment of the present invention will be described in detail with reference to the drawings. In all the drawings for describing the embodiments, the same parts are denoted by the same reference numerals in principle, and repeated descriptions thereof will be omitted.

Hereinafter, an embodiment will be described by taking an in-vehicle semiconductor device as an example, but the present invention is not limited to an in-vehicle semiconductor device.

Embodiment 1

(Overall Configuration of Semiconductor Device)

Figure 1:
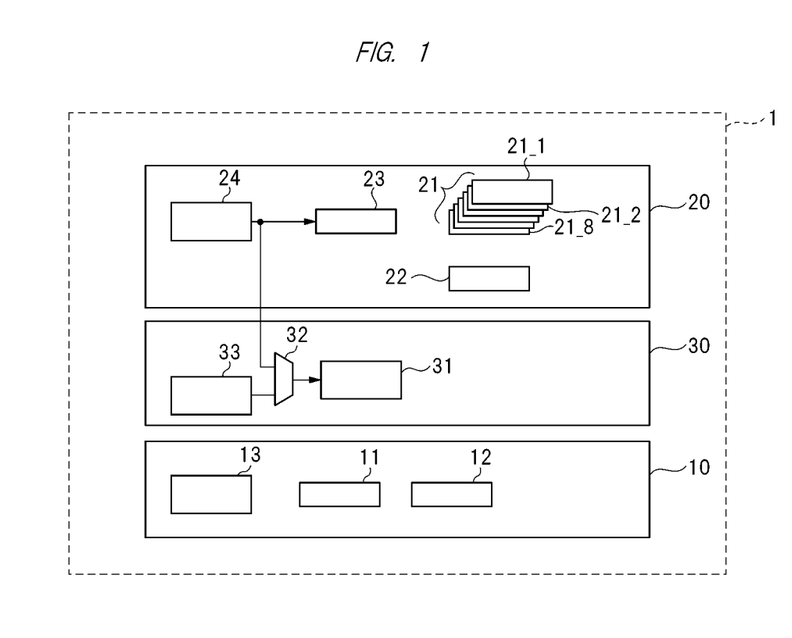
FIG. 1 is a diagram illustrating a configuration of a semiconductor device according to a first embodiment.

FIG. 1 is a diagram illustrating a configuration of a semiconductor device according to a first embodiment. In FIG. 1, reference numeral 1 denotes a semiconductor device. Although the semiconductor device 1 includes a plurality of functional blocks arranged on one semiconductor chip in order to realize a predetermined function according to a program, only functional blocks necessary for explanation are shown in FIG. 1. In FIG. 1, reference numeral 10 denotes a processing function block for executing various processes and the like, reference numeral 20 denotes a control function block for controlling the standby mode, and reference numeral 30 denotes a power supply function block for supplying a power supply voltage to the processing function block 10 and the like.

The processor 10 includes a processor (CPU)11, a peripheral circuit (a PHC)12, an oscillator circuit 13, and the like). The processor 11 and the peripheral circuit 12 are supplied with the clock signal output from the oscillation circuit 13, and the processor 11 and the peripheral circuit 12 operate based on the supplied clock signal.

The power supply functional block 20 includes a plurality of voltage regulators, a power supply control circuit 23, and an oscillation circuit 24. In FIG. 1, as an example of a plurality of voltage regulators, a voltage regulator (hereinafter, also referred to as a first regulator) 21 for supplying a power supply voltage to the processing function block 10 and a voltage regulator (hereinafter, also referred to as a second regulator) 22 for supplying a power supply voltage to a function block (not shown) are shown. Although not particularly limited, the first voltage regulator 21 includes eight voltage regulators 21_1 to 21_8. The oscillator 24 outputs a frequency lower, e.g., 32 KHz, clock-signal. The power supply control circuit 23 controls the voltage regulators 21 and 22 in accordance with a clock signal from the oscillation circuit 24.

The control function block 30 includes a standby control circuit 31 that controls the standby mode of the processing function block 10 and the power supply function block 20, a selector 32, and an oscillation circuit 33. The oscillation circuit 33 outputs a clock signal having a higher frequency (e.g., 200 MHz) than the oscillation circuit 24. The clock signal output from the oscillation circuit 24 or 33 is supplied to the standby control circuit 31 by the selector 32, and the standby control circuit 31 operates in accordance with the supplied clock signal.

The standby control circuit 31 performs control for transitioning to and returning from the standby mode to a control target such as the processor 11, the peripheral circuit 12, the oscillation circuit 13, and the first and second voltage regulators 21 and 22 disposed in the processing function block 10 and the power supply function block 20. In other words, the standby control circuit 31 can be regarded as having a standby control unit corresponding to each control target. In the first embodiment, a case where the first voltage regulator 21 in the power supply function block 20 transitions to and returns from the standby mode will be described as an example. That is, a standby control unit corresponding to the first voltage regulator 21 to be controlled will be described.

The standby control unit corresponding to the first voltage regulator 21 controls the timing related to the operation of the plurality of voltage regulators 21_1 to 21_8 when the first voltage regulator 21 is transitioned to and returned from the standby mode.

When the mode is transitioned to the standby mode, the voltage regulators 21_1 to 21_8 are stopped to reduce power consumption. As will be described in detail later with reference to the drawings, when returning from the standby mode, when the voltage regulators 21_1 to 21_8 are simultaneously activated, a large inrush current is generated, and therefore, the standby control unit corresponding to the first voltage regulator 21 changes the timing at which the voltage regulators 21_1 to 21_8 are activated (lath), thereby reducing the inrush current. Similarly, in the case of transition to the standby mode, the standby control circuit 31 changes the timing at which the voltage regulators 21_1 to 21_8 are stopped.

Although the standby control unit corresponding to the first voltage regulator 21 has been described as an example, the same applies to the standby control unit corresponding to the second voltage regulator 22, the processor 11, the peripheral circuit 12, the oscillation circuit 13, and the like.

(Standby Control Part)

Figure 2:
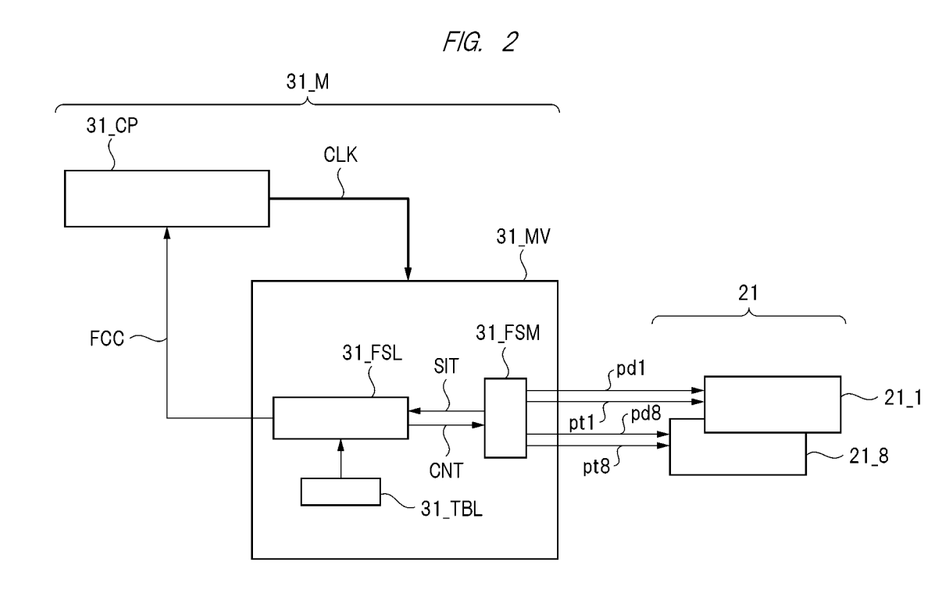
FIG. 2 is a diagram for describing a standby control unit according to Embodiment 1.

FIG. 2 is a diagram for describing a standby control unit according to Embodiment 1. In FIG. 2, the standby control unit corresponding to the first voltage regulator 21 shown in FIG. 1 is indicated by reference numeral 31_M. Also shown in FIG. 2 are voltage regulators 21_1 to 21_8 constituting the first voltage regulator 21.

The standby control unit 31_M includes a frequency output circuit 31_CP and a control circuit (hereinafter also referred to as a standby controller) 31_MV.

The frequency output circuit 31_CP is supplied with a frequency switching code (frequency control signal) FCC from the standby controller 31_MV, and outputs a clock signal CLK having a frequency specified by the frequency switching code FCC to the standby controller 31_MV. An example of the frequency output circuit 31_CP will be described later with reference to FIG. 8, and thus a detailed description thereof will be omitted.

Standby controller 31_MV includes a control circuit configured by a state machine (Finite State Machine) (hereinafter, also referred to as a state machine circuit) 31_FSM, a frequency selection control circuit 31_FSL, and a table 31_TBL.

The state machine circuit 31_FSM outputs the state information STI to the frequency selection control circuit 31_FSL in response to the control of the standby mode of the voltage regulators (hereinafter, also referred to as circuit blocks) 21_1 to 21_8. That is, the state machine circuitry 31_FSM outputs information indicating the control of each of the voltage regulators 21_1 to 21_8 at the time of transitioning to and returning from the standby mode as the state information STI.

Further, the state machine circuit 31_FSM generates a control signal pd1~pd8, pt1~pt8 for controlling the states of the voltage regulators 21_1 to 21_8 on the basis of the state information STI, the clock signal CLK, and the count value (count information) CNT, and outputs the control signal to the voltage regulators 21_1 to 21_8.

In the table 31_TBL, a plurality of pieces of state information, frequency information corresponding to each piece of state information, and count value information corresponding to each piece of state information are registered in advance as a table. The frequency information is information for specifying the frequency of the clock signal CLK output from the frequency output circuit 31_CP in the case of the corresponding state information. The count value information is time information specifying a time required to transition (state transition) the conditions of the voltage regulators 21_1 to 21_8 in the case of the corresponding state information.

Based on the state information STI supplied from the state machine circuit 31_FSM, the frequency selection control circuit 31_FSL searches for matching state information from the plurality of state information stored in the table 31_TBL. The frequency selection control circuit 31_FSL outputs the frequency information corresponding to the state information matched by the search to the frequency output circuit 31_CP as the frequency switching code FCC. The frequency selection control circuit 31_FSL outputs the count value information corresponding to the state information matched by the search to the state machine circuit 31_FSM as the count value CNT.

Thus, from the frequency output circuit 31_CP, the clock signal STI having a frequency corresponding to the state information CLK output from the state machine circuit 31_FSM is output to the state machine circuit 31_FSM, and further, from the frequency selection control circuit 31_FSL, the count value CNT corresponding to the state information is output to the state machine circuit 31_FSM.

The state machine circuitry 31_FSM counts the number of supplied clock signals CLK until the supplied count value CNT is reached, and changes the state of the control signal pd1~pd8, pt1~pt8 supplied to the voltage regulator. For example, when the counted value is reached, the state machine circuitry 31_FSM changes the control signal pd1 from a high level to a low level. Here, the frequency of the clock signal CLK to be counted is a value designated by the frequency information corresponding to the same state information as the count value information.

The voltage regulators 21_1 to 21_8 are supplied with corresponding control signals pd1~pd8, pt1~pt8 from the state machine circuitry 31_FSM. When the voltage regulator 21_1 is exemplified, the operation of the voltage regulator 21_1 is controlled by the corresponding control-signal pd1, pt2. Although described later with reference to FIG. 5, the voltage regulator 21_1 is unstable at the timing when it is started. Therefore, the voltage regulator 21_1 is capable of outputting a voltage when the control signal pd1 changes from a high level to a low level after activation. After that, when the control signal pt1 changes from the low level to the high level, a voltage is outputted.

By increasing the frequency of the clock signal CLK such that the frequency switching code FCC specified by the state information STI indicates a higher frequency in the transition period and the return period in which the voltage regulators 21_1 to 21_8 transition to the standby mode and return to the standby mode, the timing of changing the control signal pd1, pt1 can be accelerated, and the transition period and return period can be shortened.

In addition, the timing at which the state of the control signal pd1 changes can be changed according to the counted value CNT. Therefore, even if the frequency of the clock signal CLK is increased, the voltage regulator 21_1 can be stabilized and then the voltage can be outputted by appropriately setting the counter value.

Although the voltage regulator 21_1 has been described as an example, the same applies to the other voltage regulators 21_2 to 21_8.

(Operation Flow of Standby Control Unit)

Figure 3:
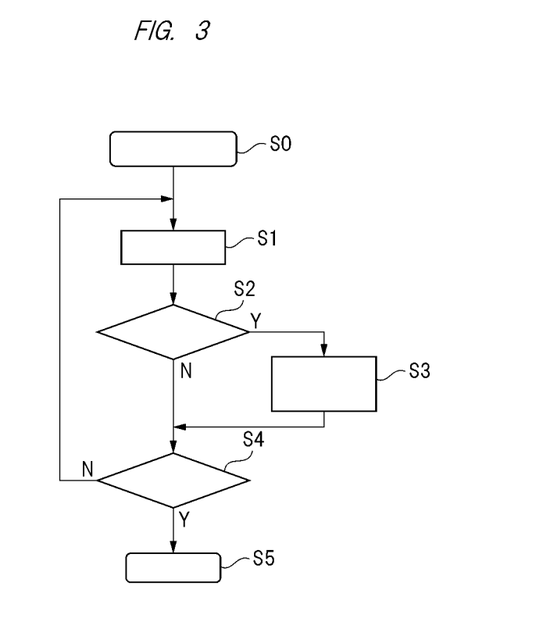
FIG. 3 is a flowchart illustrating an operation of the standby control unit according to the first embodiment.

FIG. 3 is a flowchart illustrating an operation of the standby control unit according to the first embodiment. As illustrated in FIG. 2, the standby control unit 31_M corresponds to the voltage regulators 21_1 to 21_8. Therefore, the state machine circuitry 31_FSM in the standby controller 31_MV sequentially outputs the state information STI corresponding to the voltage regulators 21_1 to 21_8.

In FIG. 3, S0 shows the steps of initiating an operation. In S1 of steps, the frequency-selection control circuit 31_FSL acquires, for example, state-information STI related to the voltage-regulator 21_1 from the state-machine circuit 31_FSM.

In S2 of steps, the frequency-selection control circuitry 31_FSL searches the table 31_TBL based on the acquired state-information STI. When the state information matching the acquired state information STI is not found in the search (N), the process proceeds to S4 of steps. On the other hand, when the matching state information is found in the table 31_TBL, the frequency selection control circuitry 31_FSL updates the frequency information and the count value information corresponding to the found state information as the frequency switching coat FCC and the count value CNT corresponding to the corresponding state information STI. Accordingly, the voltage regulator 21_1 is supplied with the control signal pd1, pt1 based on the updated frequency-switching code FCC and the count-value CNT.

In S4 of steps, a determination is made as to whether or not all sequencing has been completed. That is, it is determined whether or not the frequency-selection control circuitry 31_FSL is supplied with a new state-information STI. For example, when the state machine circuit 31_FSM is outputting the state information STI related to the voltage regulator 21_2 of the next stage (N), the process returns to the step S1, and the step S2~S4 is repeated thereafter. On the other hand, if the new state data STI is not supplied to the frequency selection control circuitry 31_FSL (Y), the operation ends at S5 of steps.

(Example of Table)

Next, state information registered in advance in the table TBL shown in FIG. 2, an exemplary frequency information and count value information will be described with reference to the drawings.

Figure 4:
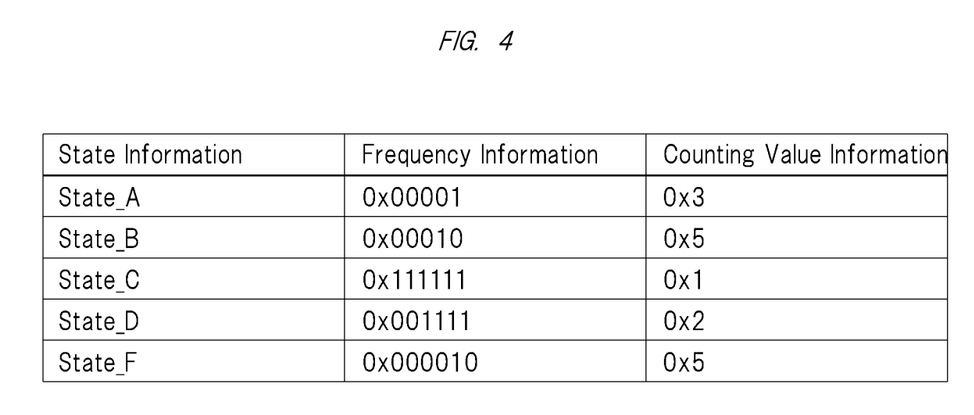
FIG. 4 is a diagram for describing information registered in the table according to the first embodiment.

FIG. 4 is a diagram for describing information registered in the table according to the first embodiment. In FIG. 4, State_A to State_F indicate state information. As illustrated in FIG. 4, frequency information and count value information are registered in the table TBL corresponding to the state information. For example, the frequency information 0x00001 and the count value information 0x3 are registered in the table TBL corresponding to the state information State_A, and the frequency information 0x111111 and the count value information 0x1 are registered in the table TBL corresponding to the state information State C.

The frequency selection control circuit 31_FSL illustrated in FIG. 2, for example, searches the table TBL in the state information STI, and outputs the frequency information 0x00001 as the frequency switching code FCC if it matches, for example, the state information State_A, and outputs the count value information 0x3 as the count value CNT. As a result, the frequency output circuitry 31_CP outputs the clock signal CLK having the frequency specified by the frequency information 0x00001. Further, the state machine circuit 31_FSM counts the clock signal CLK of the frequency at this time, and changes the state of the control signal pd1 or pt1 when it reaches the count value specified by the count value data 0x3.

In FIG. 4, five types of state information and corresponding frequency information and counted value information are registered in the table TBL, but the present invention is not limited thereto. At least two or more types of state information, frequency information, and count value information may be registered in the table TBL.

(Example of Control Signal)

Next, an exemplary control signal pd1~pd8, pt1~pt8 outputted by the state machine circuit 31_FSM illustrated in FIG. 2 based on the clock signal CLK, the state information STI, and the counted value CNT will be described with reference to the drawings.

Figure 5:
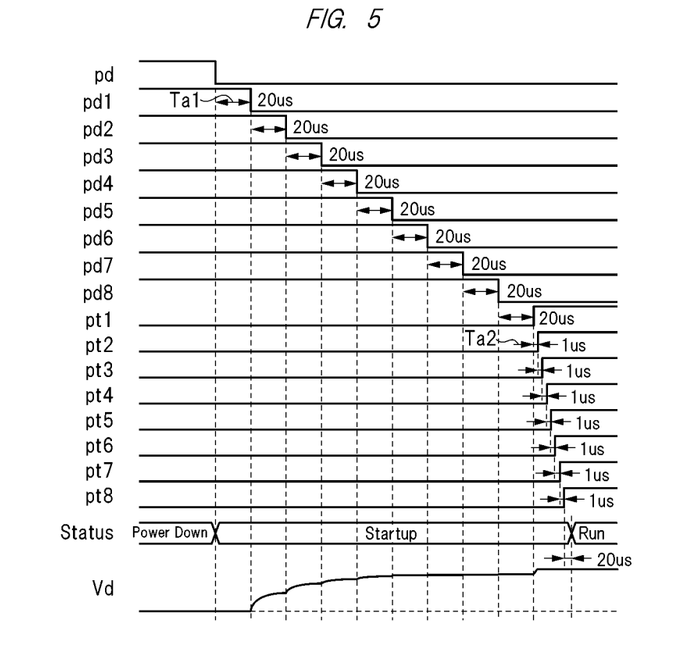
FIG. 5 is a diagram for explaining a change in a state of a control signal output by the state machine circuit according to the first embodiment.

FIG. 5 is a diagram for explaining a change in a state of a control signal output by the state machine circuit according to the first embodiment.

FIG. 5 illustrates a change in pd1~pd8, pt1~pt8 of the control signal during a recovery period in which the semiconductor device is returned from the standby mode to the normal operation mode. In the drawing, Status indicates the status of the semiconductor device, and Vd indicates the power supply voltage in the power supply voltage wire arranged in the process functional block 10 shown in FIG. 1. The power supply voltage Vd is supplied to, for example, the processor 11, and the processor 11 operates using the power supply voltage Vd as an operating voltage.

In the standby mode, Status of the device 1 is powered down, and the power supply voltage Vd is substantially at a grounded voltage. As a result, the semiconductor device 1 is in a low power consumption state.

When returning from the standby mode, the control signal pd changes from the high level to the low level. In response to a change (falling edge) of the control signal pd from a high level to a low level, the state machine circuitry 31_FSM changes the control signal pd1 from a high level to a low level Td1 a first predetermined period (e.g., 20 microseconds (20 us)). Further, the state machine circuitry 31_FSM changes the control signal pd2 from the high level to the low level after the first predetermined period in response to the change of the control signal pd1 to the low level. Thereafter, similarly, the state machine circuitry 31_FSM changes the respective voltages from the high level to the low level in order of the control signal pd3~pd8 after Td1 of the first predetermined period in response to the change of the control signal pd to the voltage regulator in the preceding stage.

The state machine 31_FSM changes the control signal pd8 from a high level to a low level, and then changes the control signal pt1 from a low level to a high level (rising edge) after the first predetermined period. The state machine circuitry 31_FSM changes the control signal pt2 from the low level to the high level after the second predetermined period of Td2 (e.g., 1 us) in response to the change of the control signal pt1 to the high level. Thereafter, similarly, the state machine circuitry 31_FSM changes the respective voltages from the high level to the low level in order of the control signal pt3~pt8 after Td2 of the second predetermined period in response to the change of the control signal (pt2~pt7) to the voltage regulator in the preceding stage.

As described above, the voltage regulators 21_1 to 21_8 can output a voltage by changing the corresponding control signal pd1~pd8 from a high level to a low level after activation, and then output a voltage by changing the corresponding control signal pt1~pt8 from a low level to a high level. The voltage regulator 21_1 is activated in response to the falling edge of the control signal pd, and the voltage regulators 21_2 to 21_8 are activated in response to the falling edge of the control signal pd1~pd7 for the voltage regulators 21_1 to 21_7 in the preceding stage. Therefore, the voltage regulators 21_1 to 21_8 can be outputted after Td1 of the first predetermined period after the activation. The first predetermined period Td1 is specified by the counted-value CNT. That is, when the voltage regulator is unstable, it is possible to suppress the voltage from being output from the voltage regulator. Further, by sequentially operating the voltage regulators 21_1 to 21_8, it is possible to suppress the concentration of the inrush current flowing through the voltage regulator.

After all of the voltage regulators 21_1 to 21_8 are capable of outputting voltages, the voltages are output in the order of the voltage regulators 21_1 to 21_8 as shown in FIG. 5. At the timing at which the voltage is output, since all the voltage regulators are stable, the output of the voltage is instructed by a control signal (pt1) to the voltage regulator (e.g., 21_1) of the preceding stage, and then the voltage regulator (21_2) is instructed to output the voltage at a second predetermined time Td2 shorter than the first predetermined time Td1. The second predetermined period Td2 is also specified by the counted-value CNT.

The voltage outputted from these voltage regulators is supplied to the above-described voltage wire and becomes a power supply voltage Vd. After the voltage from the voltage regulators 21_1 to 21_8 is supplied as the power supply voltage Vd, for example, the processor 11 starts operation (Run). That is, the above-described control is performed in Startup period from Power down to Run state. When looking at the voltage regulator 21, Startup period can be regarded as the return period from the standby mode.

In order to perform the above-described control, as the state information STI output by the state machine circuit 31_FSM, for example, a state information STI that matches the state information State_A shown in FIG. 4 may be output when the control signal pd1~pd8 and pt1 are output, and a state information STI that matches the state information State C may be output when the control signal pt2~pt8 is output. In this case, the frequency information corresponding to State_A and State C illustrated in FIG. 4 is set to the same value, and the count value is set to a value as illustrated in FIG. 4. Thus, the first predetermined time Td1 is defined by the count value information 0x3, and the second predetermined time Td2 is defined by the count value information 0x1.

(Transition Period and Return Period)

Figure 6:
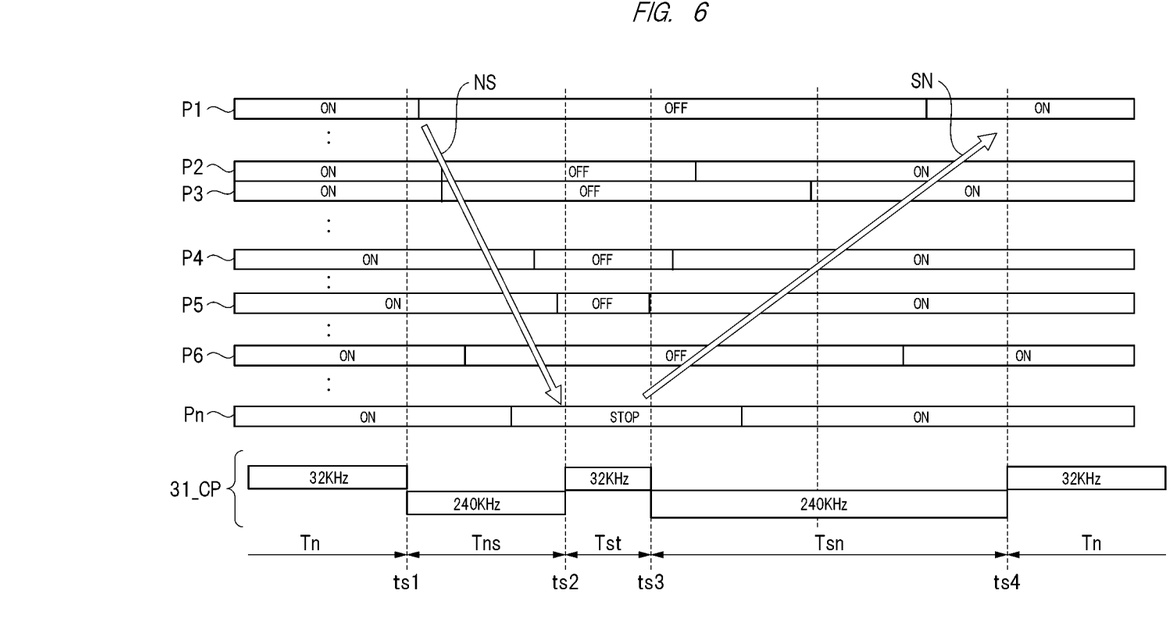
FIG. 6 is a diagram for describing a transition period and a return period according to Embodiment 1.

A transition period and a return period of the semiconductor device to the standby mode will be described with reference to the drawings. FIG. 6 is a diagram for describing a transition period and a return period according to Embodiment 1.

In FIG. 6, the horizontal axis represents time. In FIG. 6, P1~Pn indicates control in the respective functional blocks (for example, the process functional block 10, the power supply functional block 20, and the control functional block 30) of the semiconductor device 1 (FIG. 1). Here, it is assumed that the control P2 indicates the control of the power supply function prox 20. That is, the control P2 is controlled by the control signals pd, pd1~pd8 and pt1~pt8 shown in FIG. 5.

In FIG. 6, Tn indicates a period of the normal operation mode in which the processor 11 or the like is operating, Tst indicates a period of the standby mode, Tns indicates a period of transition to the standby mode, and Tsn indicates a period of return from the standby mode. In addition, NS indicates the direction of the process in transitioning from the time ts1 to the time ts2, and SN indicates the direction of the process in returning from the time ts4 to the time ts5.

In FIG. 6, the frequency output circuitry 31_CP outputs clock signals CLK of two types of frequencies in accordance with the frequency switching code FCC. That is, the frequency output circuitry 31_CP outputs clock signals of 32 KHz clock signals CLK and 240 KHz, as shown in FIG. 6. More specifically, the state machine circuit 31_FSM outputs the state information STI such that the frequency output circuit 31_CP outputs 32 KHz clock signal CLK in the period Tn of the normal operation mode and the period Tst of the standby mode. On the other hand, in the transition period Tns and the return period Tsn, the state machine circuit 31_FSM outputs the state information STI such that the frequency output circuit 31_CP outputs 240 KHz clock signal CLK.

As described above, in the period Tn of the normal operation mode and the period Tst of the standby operation mode, the frequency of the clock signal CLK output by the frequency output circuit 31_CP is lowered, so that the power dissipation can be reduced. On the other hand, in the transition period Tns and the return period Tsn, it is possible to shorten the duration of the transition period Tns and the return period Tsn by increasing the frequency of the clock signal CLK output from the frequency output circuit 31_CP, and accordingly, it is possible to lengthen the period of staying in the standby mode, and it is possible to reduce the average power dissipation.

In the period Tn of the normal operation mode, the circuit block, for example, the processor 11, arranged in the process function block 10 (FIG. 1) is operated by a clock signal from the oscillator circuit 13.

(A Case where a Low Frequency is Used in a Transition Engine and a Return Period)

Also during the transition to the standby mode and the recovery period, the control of the voltage regulator or the like can be performed by using a low-frequency clock signal such as 32 KHz.

The control signal pt2~pt8 shown in FIG. 5 is capable of generating a rising control signal, for example, in response to a rising edge of the control signal for the voltage regulator of the preceding stage. When the control signal pt2 is exemplified, the control signal pt2 may be raised in response to a rising edge of the control signal pt1. That is, the control signal pt2~pt8 can be generated even when 32 KHz clocking signal is used.

However, for a control signal that is required to be maintained for a relatively long period of time, that is, in the embodiment of FIG. 5, the control signal pd1~pd8 that is required to be maintained at a high level Td1 the first predetermined period of time is difficult to generate using 32 KHz clocking signal. As described with reference to FIG. 5, the first predetermined period Td1 is 20 us, but in 32 KHz clock-signal, one period thereof is 1/32 KHz=31.25 us. Therefore, when 32 KHz clocks are used, the first predetermined period Td1 is not 20 us but 31.25 us. This means that the time required to activate one step, e.g. one voltage regulator, before the voltage can be output is increased. In the return period, as can be seen from FIG. 5, since such steps are executed continuously, the duration of the return period becomes longer, the period of the standby mode becomes shorter, and the average power consumption increases.

When the control is performed using 32 KHz clock-signal in the transition period, similarly, the duration required for one step becomes long, the time of the transition period becomes long, and the period of the standby mode becomes short. As a result, the average power consumption increases.

Note that, in the first embodiment, the second predetermined time Td2 is set by counting the clock signal also for the control signal pt2~pt8, but as described above, the control signal pt2~pt8 may be generated in response to the changing edge of the control signal for the voltage regulator in the preceding stage.

(Specific Example)

A specific example of a case in which the semiconductor device is returned from the standby mode and transitions to the standby mode again at constant time intervals in the engine stop period in which the engine is stopped will be described with reference to the drawings.

Figure 7A:
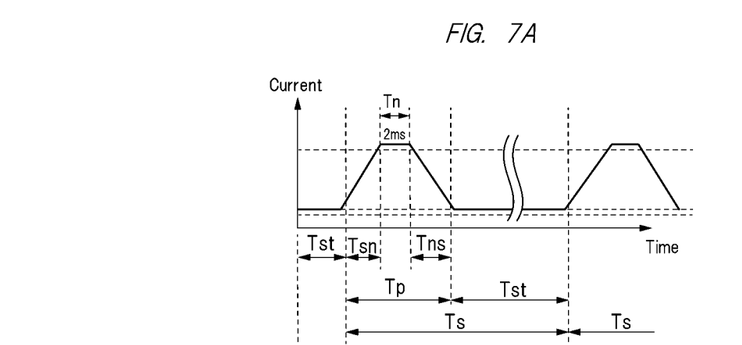
FIGS. 7A, 7B and 7C are diagrams illustrating a configuration of a semiconductor device according to a first embodiment of the present invention.
Figure 7B:
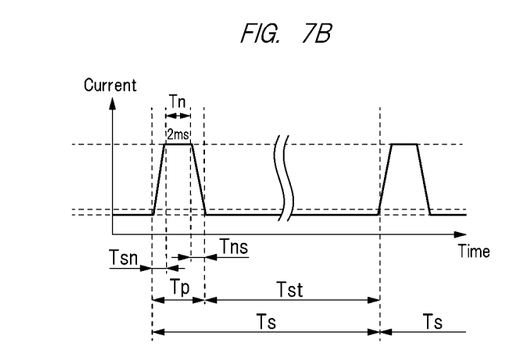
Figure 7C:
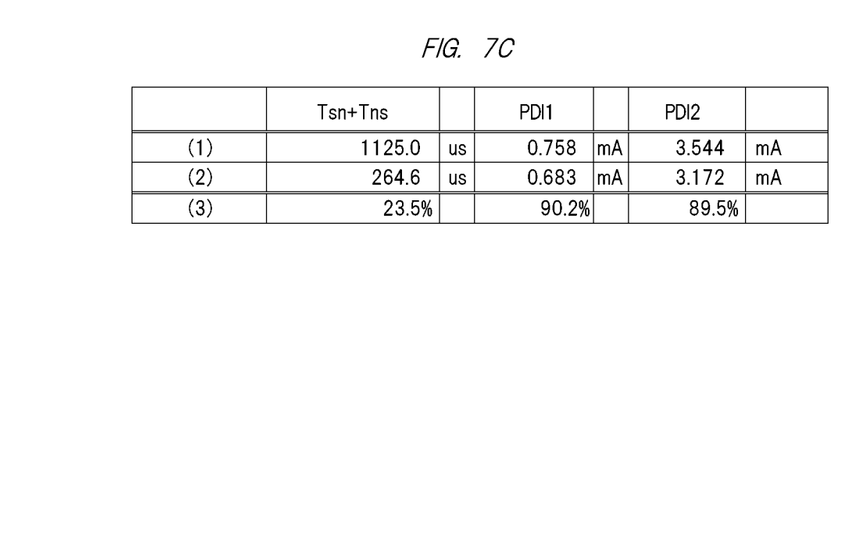

FIG. 7 is a diagram for describing an operation of the semiconductor device according to Embodiment 1. Here, FIG. 7A shows a change in current consumed when a control signal pd1~pd8, pt1~pt8 for controlling the voltage regulators 21_1 to 21_8 shown in FIG. 2 is generated in 32 KHz clock signal. Further, in the configuration shown in FIG. 2, 7B shows a change in power consumed when the frequency output circuitry 31_CP outputs 32 KHz clock signal CLK in the period of the standby mode and outputs 240 KHz clock signal CLK in the transition period and the return period in the period of the standby mode. Further, the diagram 7C is a comparative table comparing the case of the diagram 7A and the case of the diagram 7B.

In the FIGS. 7A and 7B, the horizontal axis represents the duration and the vertical axis represents the current consumed by the device. During the engine-shutdown period, the semiconductor device returns from the standby mode every TS for a predetermined period of time, and transitions to the standby mode again. In the illustrated 7A and 7B, Tst indicates a period of the standby mode, and Tn indicates a period of the normal operation mode. Here, it is assumed that the period Tn of the normal operation mode is 2 ms (milliseconds), and in this period Tn, for example, the processor executes a predetermined process.

In 7A diagram and 7B, Tsn indicates a return period for returning from the standby operation mode to the normal operation mode, and Tns indicates a transition period for transitioning from the normal operation mode to the standby operation mode. In the transition period Tns, control is performed to transition various circuit blocks including, for example, the voltage regulators 21 and 22 from the normal operation mode to the standby mode. On the other hand, in the return period Tsn, control is performed for returning various circuit blocks including the voltage regulators 21 and 22 from the standby mode to the normal operation mode.

In the illustrated 7A, the control of the circuit blocks in the transition-period Tns and the return-period Tsn is performed in accordance with the clock-signal of 32 KHz. Therefore, the transitional period Tns and the return period Tsn become longer. In other words, for example, the period in which the control of the transition and the return of the voltage regulator 21 and the like is performed becomes longer, and the mean power consumed by the semiconductor device in the fixed time TS becomes higher.

In contrast, in the illustrated 7B, the control of the circuit-block in the transition-period Tns and the return-period Tsn is performed in accordance with 240 KHz clock-signal. Therefore, the transitional period Tns and the return period Tsn are shortened. That is, for example, it is possible to shorten the period in which the control of the transitions and the return of the voltage regulator 21 and the like is performed, and it is possible to reduce the average-power-consumption of the semiconductor device TS a certain period of time.

In 7C shown in FIG. 1, (1) shows an exemplary transition-recovery (time of transition period+time of recovery period) time Tsn+Tns and an exemplary average-consumption current PDI1, PDI2 when 32 KHz clock-signal CLK is used, as described with reference to 7A. Further, in 7C shown in the drawing, (2) shows an exemplary transition-recovery-time Tsn+Tns and an exemplary average-consumption current PDI1, PDI2 when the clock-signal CLK of 240 KHz is used, as described with reference to the drawing 7B. Further, in 7C of the drawing, (3) shows the reduction rate when using the clock signal of 240 KHz with respect to the case of using the clock signal of 32 KHz.

As for the mean consumed current, PDI2 for PDI1 and 40 ms for 200 ms is shown in 7C as a fixed-time TS. In the transition period Tns and the recovery period Tsn, by increasing the frequency of the clock signal used for the control, the transition recovery time Tsn+Tns can be shortened as shown in the diagram 7C, and the mean consumed current PDI1, PDI2 can be reduced. As a result, the average power consumption can be suppressed.

In the FIGS. 7A and 7B, Tp indicates a period of the sum of the period Tn in the normal operation mode, the transition period Tns, and the return period Tsn. The period Tp corresponds to a period in which the power is mainly consumed by the semiconductor device in the predetermined period TS.

(Example of Frequency Output Circuit)

Figure 8:
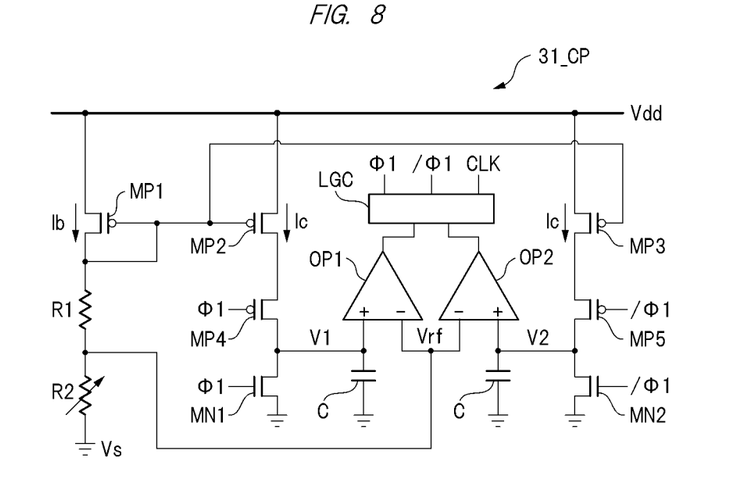
FIG. 8 is a circuit diagram illustrating a configuration of a frequency output circuit according to Embodiment 1.

FIG. 8 is a circuit diagram illustrating a configuration of a frequency output circuit according to Embodiment 1. In the drawing, MP1~MP5 represents a P-channel FET (hereinafter, referred to as a P-type FET), MN' and MN2 represent an N-channel FET (hereinafter, referred to as an N-type FET), OP' and OP2 represent a comparator, and C represents a capacitor. In addition, R1 represents a fixed resistance, and R2 represents a variable resistance whose resistance varies according to the frequency-switching code FCC described with reference to FIGS. 2 and 3. In the drawing, LGC is a logic circuit that generates a clock signal CLK, an internal clock signal φ1, and an inverted internal clock signal /φ1 (a clock signal whose phase is inverted with respect to the internal clock signal φ1) based on the output from the comparator circuit OP1, OP2. These elements constitute the frequency output circuit 31_CP shown in FIG. 2.

A current mirror circuit is configured by the P-type FETMP1~MP3, and the current Ib and Ic flowing through the current mirror circuit are changed by changing the resistance of the variable resistance R2. The current Ib determines that the capacitance C is charged by the current V1, V2 of the comparator OP1, OP2. The comparison circuit OP1, OP2 compares the reference voltage Vrf with the input voltage V1, V2, and supplies the comparison to the logic circuit LGC. The logic LGC generates a clock signal CLK, an internal clock signal φ1, and an inverted internal clock signal /φ1 based on the supplied comparison result. The period of the clock signal CLK formed by the frequency-output circuit having the configuration shown in FIG. 8 is as follows.

$$T=(2*Vrf*C)/Ic=2*R2*C(Ib/Ic) \quad \text{expression}$$

Although FIG. 8 illustrates an example in which clock signals having different frequencies are formed by one oscillation circuit, the frequency output circuit 31_CP is not limited to the configuration illustrated in FIG. 8. For example, a plurality of oscillation circuits that form clock signals having different frequencies may be prepared, and an oscillation circuit that forms clock signals having frequencies according to the frequency switching code FCC may be selected.

Embodiment 2

Figure 9:
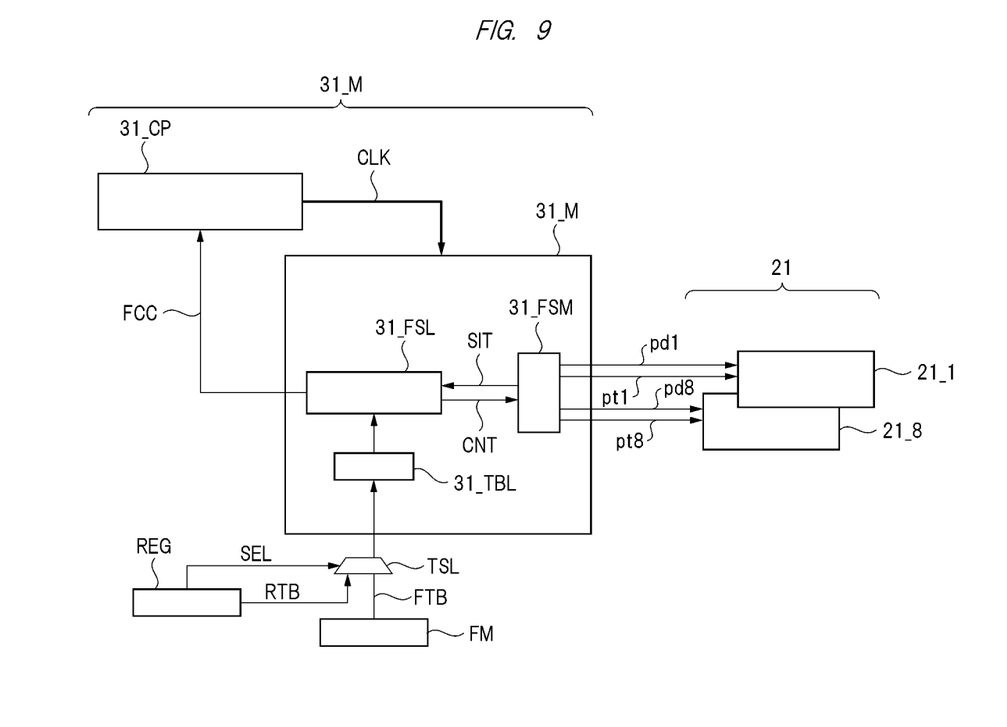
FIG. 9 is a diagram for describing a standby control unit according to Embodiment 2.

FIG. 9 is a diagram for describing a standby control unit according to Embodiment 2. Since FIG. 9 is similar to FIG. 2, the differences will be mainly described.

The main difference is that, in FIG. 9, the register REG, the electrically rewritable non-volatile memory (flash memory) FM, and the selector TSL are added to the standby control unit 31_M.

The flash memory FM and the register REG store the state information, the frequency information, and the counted-value information as described with reference to FIG. 4. The state information, the frequency information, and the count value information stored in the flash memory FM and the register REG are supplied to the table 31_TBL via the selector TSL, and the information registered in the table 31_TBL is rewritten by the information supplied via the selector TSL.

Although not particularly limited, the register REG also stores a control-information SEL for controlling the selector TSL. In accordance with the control information SEL, the selector TSL selects the information supplied from the register REG and the flash memory FM, and outputs the selected information.

According to the second embodiment, it is possible to easily update and add the state information, the frequency information, and the count value information.

In FIG. 9, the register REG and the flash memory FM are exemplified as the storage circuitry for storing the state information, the frequency information, and the count value information, but the present invention is not limited thereto.

Although FIG. 2 and FIG. 9 show an example in which the standby control unit 31_M includes the frequency output circuit 31_CP, the present invention is not limited to this. For example, the oscillation circuit 24 illustrated in FIG. 1 may be used as the frequency output circuit 31_CP. In this case, the frequency of the clock signal formed by the oscillator 24 may be switched by the frequency switching code FCC from the standby controller 31_MV.

Although the invention made by the present inventors has been described in detail based on the embodiments, it is needless to say that the present invention is not limited to the above-described embodiments and can be variously modified without departing from the gist thereof.

What is claimed is:

1. A semiconductor device comprising:
   a frequency output circuit configured to output clock signals having a given frequency;
   a circuit block configured to perform an operation in any one of a plurality of operation states; and
   a standby controller coupled to the frequency output circuit and the circuit block, and configured to control the circuit block to transition to a standby mode,
   wherein the standby controller comprises:
      a control circuit configured to control the circuit block and output state information of the circuit block, and
      a frequency selection circuit configured, in response to the state information, to output:
         a frequency control signal to the frequency output circuit to control a frequency of the clock signals; and
         a counting information signal to the control circuit to designate a timing of a state transition of the circuit block,
      wherein the control circuit is further configured to control the circuit block to transition to the standby mode based on the counting information from the frequency selection circuit and the clock signals from the frequency output circuit.

2. The semiconductor device according to claim 1,
   wherein the counting information signal includes the number of the clock signals having the given frequency, and
   wherein the standby controller is configured to output a control signal to transition a state of the circuit block at a duration designated by the counting information for the state transition.

3. The semiconductor device according to claim 2, wherein the circuit block includes a voltage regulator configured to output a power supply voltage to a processor that operates according to a program.

4. The semiconductor device according to claim 2, wherein the standby controller further comprises an information table configured to store:
   state information;
   a frequency information that designates a frequency associated with the state information; and a counting value information that designates a state transition time associated with the state information, wherein the frequency selection circuit identifies the frequency information and the counting value information associated with the state information from the control circuit, and outputs the frequency control signal and the counting information signal based on the frequency information and the counting value information, respectively.

5. The semiconductor device according to claim 4 further comprises a memory circuit configured to store the state information, the frequency information and the counting value information registered on the information table.

6. The semiconductor device according to claim 5, wherein the memory circuit comprises:

a nonvolatile memory;

a register circuit; and a selector coupled one of the nonvolatile memory and the register circuit to the information table, wherein the state information, the frequency information and the counting value information of the nonvolatile memory or the register are stored on the information table.

* * * * *